(12) United States Patent
Jung et al.

(10) Patent No.: US 10,476,297 B2
(45) Date of Patent: Nov. 12, 2019

(54) DEVICE AND METHOD FOR WIRING A BATTERY MANAGEMENT SYSTEM

(71) Applicant: Fraunhofer-Gesellschaft zur Foerderung der angewandten Forschung e.V., Munich (DE)

(72) Inventors: Max Jung, Bad Krozingen (DE); Stephan Lux, Emmendingen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 400 days.

(21) Appl. No.: 15/257,540

(22) Filed: Sep. 6, 2016

(65) Prior Publication Data

US 2016/0372969 A1    Dec. 22, 2016

Related U.S. Application Data

(63) Continuation of application No. PCT/EP2015/054959, filed on Mar. 10, 2015.

(30) Foreign Application Priority Data

Mar. 11, 2014 (DE) .................. 10 2014 204 473

(51) Int. Cl.
*H02J 7/00* (2006.01)
*H02J 9/00* (2006.01)

(52) U.S. Cl.
CPC ............. *H02J 9/005* (2013.01); *H02J 7/007* (2013.01); *H02J 7/0031* (2013.01)

(58) Field of Classification Search
CPC ....................................................... H02J 9/005
USPC ................................................. 320/104, 134
See application file for complete search history.

(56) References Cited

U.S. PATENT DOCUMENTS

| | | | |
|---|---|---|---|
| 5,430,363 A | 7/1995 | Kim | |
| 2002/0140397 A1* | 10/2002 | Hasegawa | H02J 7/1423 320/104 |
| 2010/0104929 A1 | 4/2010 | Schäfer et al. | |
| 2012/0043819 A1 | 2/2012 | Kang et al. | |
| 2012/0188714 A1 | 7/2012 | Von Borck et al. | |
| 2013/0096762 A1 | 4/2013 | Houchin-Miller et al. | |
| 2013/0127418 A1 | 5/2013 | Oh et al. | |
| 2013/0187660 A1 | 7/2013 | Ishikawa et al. | |
| 2013/0207614 A1 | 8/2013 | Schafer et al. | |
| 2013/0257354 A1 | 10/2013 | Koyama | |
| 2014/0035365 A1 | 2/2014 | Yoo | |
| 2014/0062413 A1 | 3/2014 | Kim | |

FOREIGN PATENT DOCUMENTS

| | | |
|---|---|---|
| CN | 101944758 A | 1/2011 |
| CN | 102231553 A | 11/2011 |
| CN | 103326080 A | 9/2013 |

(Continued)

*Primary Examiner* — Richard V Muralidar
(74) *Attorney, Agent, or Firm* — Perkins Coie LLP; Michael A. Glenn

(57) ABSTRACT

A circuit system includes a battery management system, a first switch unit and a controller. In a first state, the first switch unit conductively connects a first energy source to the battery management system, and in a second state it interrupts the energy supply of the battery management system from the first energy source. The controller controls the first switch unit.

11 Claims, 5 Drawing Sheets

(56) References Cited

FOREIGN PATENT DOCUMENTS

| | | |
|---|---|---|
| CN | 103580090 A | 2/2014 |
| DE | 102008052986 A1 | 4/2010 |
| DE | 102011079292 A1 | 1/2013 |
| EP | 1289096 A2 | 3/2003 |
| EP | 2204874 A2 | 7/2010 |
| EP | 2528188 A1 | 11/2012 |
| EP | 2549581 A2 | 1/2013 |
| JP | 2003010179 A | 1/2003 |
| JP | 2007004229 A | 1/2007 |
| JP | 2008283786 A | 11/2008 |
| JP | 2011029010 A | 2/2011 |
| JP | 2012083283 A | 4/2012 |
| JP | 2012249369 A | 12/2012 |
| KR | 20120012659 A | 2/2012 |
| KR | 1020130078352 A | 7/2013 |
| WO | 2013010832 A2 | 1/2013 |

\* cited by examiner

DEVICE AND METHOD FOR WIRING A BATTERY MANAGEMENT SYSTEM

CROSS-REFERENCE TO RELATED APPLICATIONS

This application is a continuation of copending International Application No. PCT/EP2015/054959, filed Mar. 10, 2015, which claims priority from German Application No. 102014204473.1, filed Mar. 11, 2014, which are each incorporated herein in its entirety by this reference thereto.

Embodiments of the present invention relate to a circuit system for wiring a battery management system. Further embodiments relate to a method of wiring a battery management system.

BACKGROUND OF THE INVENTION

Management systems, e.g., in the form of electronic circuit boards comprising software that is integrated accordingly, may be used for monitoring, controlling and measuring rechargeable chemical energy storage devices in various fields of application. Said management systems will be referred to below as battery management systems (abbreviation: BMS). One example of a chemical storage device are lithium ion batteries, which are becoming more and more attractive due to their high energy density.

Since individual battery cells mostly have only very small voltages—lithium ion battery cells have a nominal voltage of 3.6 V, for example—battery cells are electrically connected in series to achieve higher voltages. Moreover, it is highly useful to connect them in parallel to increase capacitance. Such clusters are referred to as battery systems. It is recommendable to monitor said clusters of cells by means of a BMS since otherwise overcharging and exhaustive discharges may occur during charging and discharging, respectively. In the worst case, this may cause a battery cell to explode. In addition, it may be important for various reasons to know the current states of charge of the individual battery cells as well as their temperatures. Furthermore, it should be possible to create appropriate connections at the system level, a cooling system for the battery system may be used in order to be able to provide higher powers. For monitoring such battery systems, a BMS itself involves energy supply. Said energy supply may be configured to be correspondingly efficient and reliable.

In conventional technology concerning energy supply for a BMS, the entire electronics or at least a circuit part of the BMS is supplied with energy directly from the battery cells to be monitored DE102008052986, EP2204874, DE102011079292, EP2549581. The other circuit part is supplied, alternatively, from an external energy source or, in the case of grid-independent systems, also from the battery cells to be monitored. This results in that due to its own energy consumption, a BMS may exhaust a battery system or an individual battery cell. This may occur particularly when the battery system is not charged for a long time. For example, an electric vehicle that sits in the garage without receiving any energy supply for several weeks during the summer holidays. In the event of repair works or of being stored for several months, the BMS may be mechanically separated from the battery.

SUMMARY

According to an embodiment, a circuit system may have: a battery management system, a first switch unit which in a first state conductively connects a first energy source to the battery management system and in a second state opens so as to disconnect the energy supply of the battery management system from the first energy source, a second switch unit, which in a first state conductively connects a second energy source to the battery management system and in a second state opens so as to disconnect the energy supply of the battery management system from the second energy source, and a controller which controls the first switch unit and the second switch unit, the battery management system including at least one unit of battery-cell electronics configured to be supplied with energy by the first energy source, and a monitoring unit configured to be supplied with energy by the second energy source, and the controller being configured to control the first switch unit and the second switch unit such that the following applies: when the second switch unit is in the second state, the first switch unit will also be in the second state.

According to another embodiment, a method of wiring an energy supply system of a battery management system may have the steps of: controlling a first switch unit and a second switch unit on the part of a controller, which controlling may have the steps of: connecting a first energy source to at least one unit of battery-cell electronics of the battery management system on the part of the first switch unit in a first state; disconnecting the energy supply of the battery-cell electronics of the battery management system from the first energy source in a second state of the first switch unit in that the first switch unit opens, connecting a second energy source to a monitoring unit of the battery management system on the part of the second switch unit in a first state; and disconnecting the energy supply of the monitoring unit of the battery management system from the second energy source in a second state of the second switch unit in that the second switch unit opens, the first switch unit and the second switch unit being controlled such that the following applies: when the second switch unit is in the second state, the first switch unit will also be in the second state.

According to another embodiment, a non-transitory digital storage medium may have a computer program stored thereon to perform the method of wiring an energy supply system of a battery management system, which method may have the steps of: controlling a first switch unit and a second switch unit on the part of a controller, which controlling may have the steps of: connecting a first energy source to at least one unit of battery-cell electronics of the battery management system on the part of the first switch unit in a first state; disconnecting the energy supply of the battery-cell electronics of the battery management system from the first energy source in a second state of the first switch unit in that the first switch unit opens, connecting a second energy source to a monitoring unit of the battery management system on the part of the second switch unit in a first state; and disconnecting the energy supply of the monitoring unit of the battery management system from the second energy source in a second state of the second switch unit in that the second switch unit opens, the first switch unit and the second switch unit being controlled such that the following applies: when the second switch unit is in the second state, the first switch unit will also be in the second state, when said computer program is run by a computer.

Embodiments of the present invention provide a circuit system comprising a battery management system, a first switch unit and a controller. In a first state, the first switch unit conductively connects a first energy source to the battery management system, and in a second state, it disconnects the energy supply of the battery management system from the first energy source, the controller controlling the first switch unit.

In addition, a method of wiring an energy supply system of a battery management system is provided. The method comprises the following steps:

controlling a first switch unit on the part of a controller,
connecting a first energy source to the battery management system on the part of the first switch unit in a first state of the first switch unit, and
disconnecting the energy supply of the battery management system from the first energy source in a second state of the first switch unit.

In addition, a computer program comprising a program code for performing the above-described method, when the computer program runs on a computer or processor, is provided.

The present invention makes use of the effect that by means of intelligently disconnecting a battery management system from a first energy source by a first switch unit, no more electrical energy is supplied to the battery management system. Increased self-discharge of the first energy source and/or increased consumption of energy from the first energy source is curbed, which increases energy efficiency. Reduced energy consumption and increased efficiency entail economic advantages and are easy on the environment. This is highly significant in particular with battery supply systems. In addition, relatively long downtimes can be tolerated without regularly testing the first energy source. Mechanical separation (disconnection) of the battery management system from the first energy source is no longer required. This results in improved maintainability of the circuit system. The reliability of the circuit system is further increased in some embodiments in that exhaustive discharge due to self-discharge by the battery management system is prevented in advance in that the battery management system is capable of intelligently switching itself off if it detects a low state of charge of the first energy source.

In embodiments, the first energy source may be a battery system which is controlled (regulated) by the battery management system. Therefore, energy self-sufficient operation of the battery management system along with the first energy source is possible.

In further embodiments, the circuit system may further include a second switch unit which in a first state conductively connects a second energy source to the battery management system and in a second state disconnects the energy supply of the battery management system from the second energy source, the controller also controlling the second switch unit. The second energy source may be configured as an energy supply network or on-board power supply. By means of the second switch unit, the battery management system may be connected to a second energy source and be supplied with energy; typically, this is easy on the state of charge of the first energy source. On the one hand, the second energy source enables certain functions of the battery management system to be supplied with energy via the second energy source when the energy supply from the first energy source is interrupted, and on the other hand, parts of the battery management system may be supplied with energy from the second energy source even when the energy supply from the first energy source is active, for the purpose of lightening the burden on the first energy source. The energy supply network or the on-board power supply represent energy sources independent of the first energy source. An energy supply network is available in most inhabited areas. In vehicles, there is often an additional independent on-board power supply.

In embodiments, the circuit system may comprise a protective circuit configured to limit a current intensity present between the first energy source and the second energy source to an admissible maximum value or essentially to zero. By limiting the current intensity that is present between the two energy sources, an uncontrolled short-circuit current can be prevented. In one embodiment, the current intensity is essentially limited to zero. In this manner, the second energy source is prevented from supplying the first energy source with energy or vice versa, the first energy source is prevented from supplying the second energy source with energy.

The controller may be configured to be supplied with electrical energy from the first energy source or a further energy source. The controller advantageously has only little energy requirement so as to place as little burden as possible on the first energy source. In the event that the controller is supplied with energy from the first energy source, the entire circuit system can be operated in an energy self-sufficient manner. If the controller is supplied with electrical energy from a further energy source, the burden placed on the first energy source, in the event that the first switch unit is in a second state, may be fully eliminated, i.e., there will then be no more loads connected to the first energy source.

The controller may be configured as part of the battery management system. As a result, the controller may be integrated into the battery management system, for example, whereby space and cost may be saved.

The battery management system may include battery-cell electronics and a monitoring unit, it being possible for the battery management system to be configured such that the battery-cell electronics is supplied with energy from the battery system and that the monitoring unit is supplied with energy from the second energy source. Due to the energy supply coming from two different energy sources, the energy supply may be switched on (additionally connected) or off for part of the battery management system, whereas another part of the battery management system may be supplied with energy independently thereof, and/or may also be switched on or off. In this manner, it is also possible to save energy from the first energy source in that only part of the battery management system is supplied with energy from the first energy source.

In further embodiments, the battery-cell electronics may be arranged at a location remote from the battery management system. It is also possible to arrange a plurality of battery-cell electronics at the battery cells. By detecting the data in a decentralized manner, the amount of data exchanged between the battery management system and the battery cells may be reduced, for example. Moreover, the wiring expenditure for the circuit system may be reduced.

The battery management system may be configured to adopt various operating states; the battery management system will adopt a first operating state when the first switch unit and the second switch unit are in a first state, will adopt a second operating state when the first switch unit is in the second state and the second switch unit is in the first state, and will adopt a third operating state when the first switch unit and the second switch unit are in the second state. In a first operating state, the battery management system is supplied with energy from both energy sources; monitoring and controlling of the battery system may be fully activated. In the second operating state, the battery management system is supplied with energy by the second energy source only, monitoring and controlling of the battery system may be reduced in this state, whereby energy may be saved, for example. In a third operating state, in which the battery management system is disconnected from both energy sources, the battery management system consumes no energy.

Moreover, the battery management system may be configured to generate, on account of battery information output by the battery-cell electronics and of monitoring information output by the monitoring unit, control information and to transfer said control information to the controller. For example, the battery management system may be configured to ascertain that no energy is flowing to the first energy source and that, also, no energy is flowing out of the first energy source, and to consequently cause a first operating state of the battery management system to change to a second operating state of the battery management system. The control information is output by the controller and causes the first switch unit and/or the second switch unit to change their respective states. As a result, the operating state of the battery management system is changed. When no energy is flowing to or out of the first energy source, the battery management system will be able to change from a normal operating mode to a standby mode and to thereby reduce the energy consumption of the first energy source.

In addition, a method of wiring an energy supply system of a battery management system is provided. The method comprises the following steps: controlling a first switch unit on the part of a controller, and connecting a first energy source to the battery management system on the part of the first switch unit in a first state, disconnecting the energy supply of the battery management system from the first energy source in a second state of the first switch unit.

Moreover, a computer program comprising a program code for performing the above-described method, when the computer program runs on a computer or processor, is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
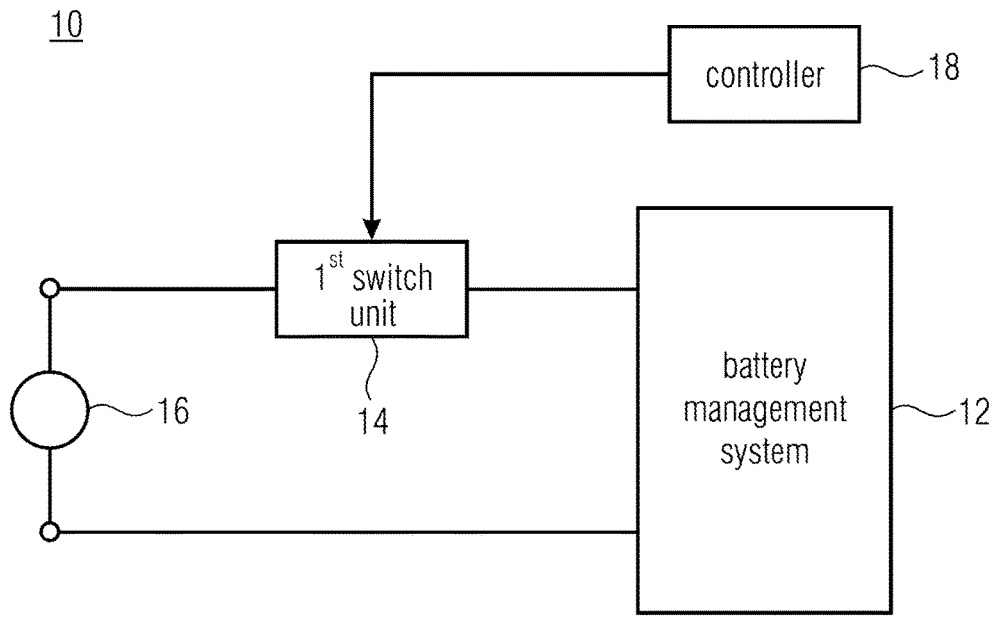
FIG. 1a shows a schematic representation of a first embodiment of a circuit system, comprising an external controller.

In the subsequent description of the embodiments of the invention, elements that are identical or equivalent will be provided with identical reference numerals in the figures, so that their descriptions in the different embodiments are interchangeable.

Figure 1B:
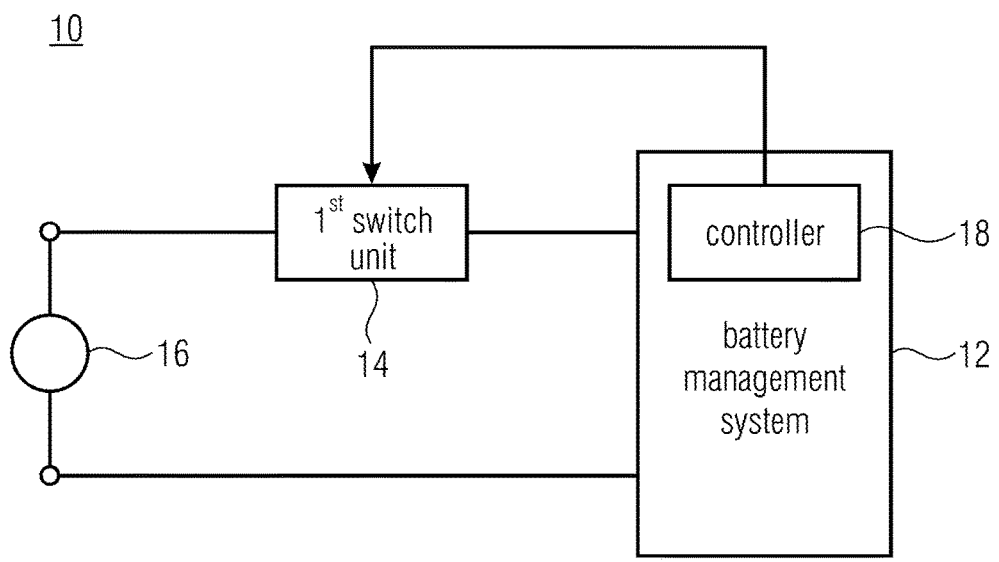
FIG. 1b shows a schematic representation of a second embodiment of the circuit system, comprising a controller integrated in the battery management system.

FIGS. 1a and 1b show schematic representations of first and second embodiments of a circuit system 10. The circuit system 10 in accordance with the first and second embodiments, respectively, each includes a battery management system 12, a first switch unit 14 which in a first state conductively connects a first energy source 16 to the battery management system 12 and disconnects, in a second state, the energy supply of the battery management system 12 from the first energy source 16. In addition, the circuit system 10 includes a controller 18 controlling the first switch unit 14.

In FIG. 1a, the controller 18 is an external unit with regard to the battery management system 12. However, the controller 18 may also be integrated into the battery management system 12, as is shown in FIG. 1b.

A battery management system 12 (BMS) is an electronic circuit or unit for regulating, monitoring, measuring and controlling a rechargeable chemical energy source 16, such as a battery cell or a battery system, or an accumulator, for example. A battery management system 12 becomes useful when a plurality of battery cells are interconnected to form a battery system. A battery system 12 may include one or more battery cells. The battery management system 12 is intended to detect, monitor and regulate the effects caused by the inevitable production-related variances of various parameters of the battery cells, such as capacitance and leakage currents, for example. As a battery cell or battery system (battery unit), any type of battery is feasible, both secondary and primary (example: lithium ion battery cells, all kinds of chemical substances as battery cells, lead accumulators, nickel-cadmium batteries, redox-flow batteries).

The first switch unit 14 (first electrical switch unit) may include an electromechanical switch such as a relay, for example, or any other mechanical switch configured as a normally closed contact or as a normally open contact. Moreover, the first switch unit may also include a semiconductor switch such as a transistor or a field-effect transistor, for example. The first switch unit 14 may adopt at least a first state and a second state. Controlling of the first switch unit 14 may be selected differently, e.g., to be digital (e.g., microcontroller) or analog.

In a first state, there is a low-resistance, electrically conductive connection between the first energy source 16 and the battery management system 12, so that an electric circuit is closed. In a second state, the electric circuit between the first energy source 16 and the battery management system 12 is open, i.e. there is no electric connection, or only a high-resistance electric connection, between the energy source 16 and the battery management system 12. In the second state, the flow of energy to the battery management system is interrupted or disconnected, whereby no discharge of the first energy source 16 on the part of the battery management system 12 takes place.

The controller 18 may send to the first switch unit 14 a control demand to change between the first state and the second state. The controller 18 may also be configured to query a state of the first switch unit 14, or to be told said state by the first switch unit 14. Because of that, the state of the first switch unit 14 is known to the controller 18 or can be queried.

The first energy source 16 of the circuit system 10 may be a battery system 24 controlled by the battery management system 12. The first energy source 16, which supplies the battery management system 12 with energy, may simultaneously be the battery system monitored by the battery management system 12. In this manner, energy self-sufficient operation of the circuit system 10 is possible.

Figure 2:
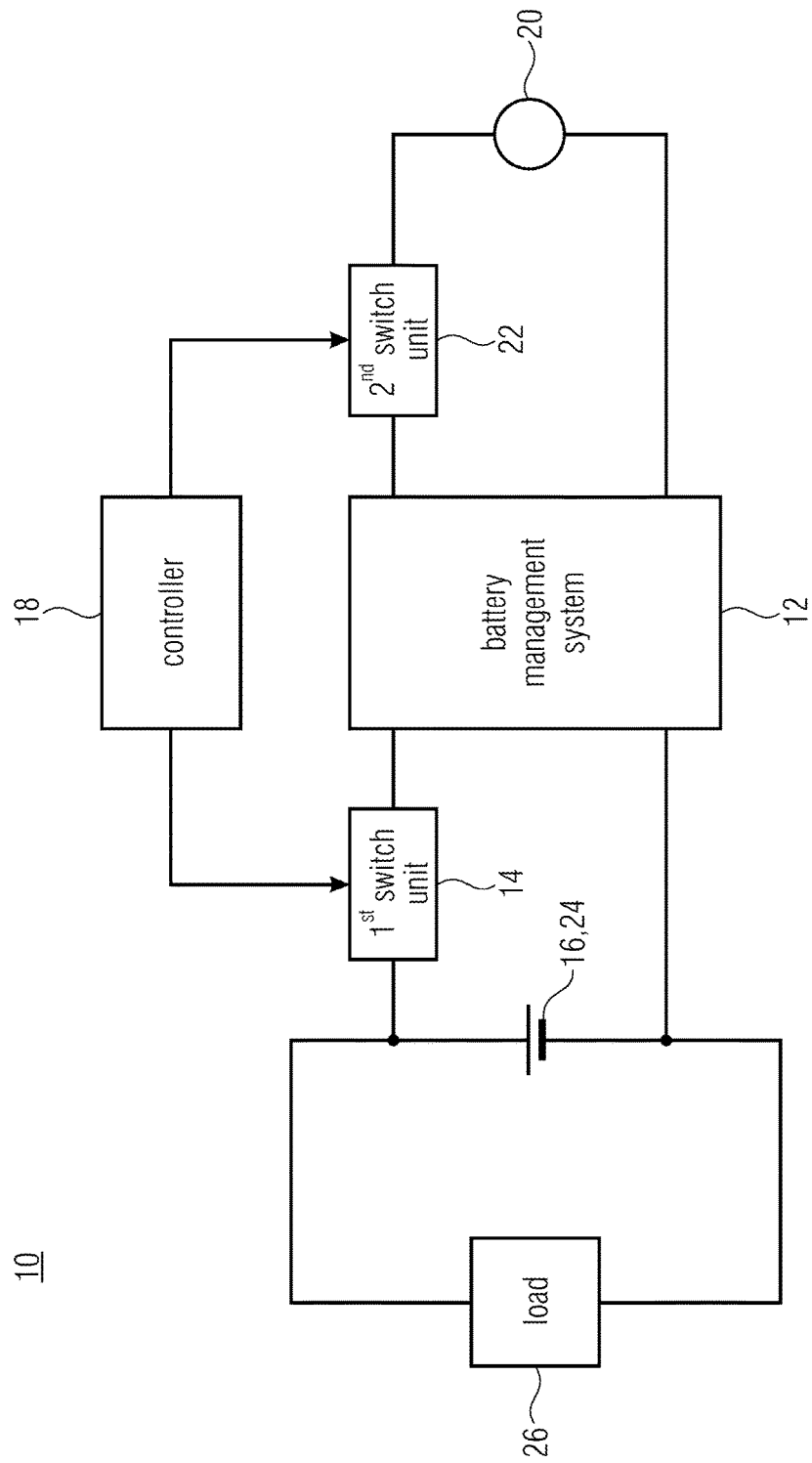
FIG. 2 shows a schematic representation of a further embodiment of a circuit system.

FIG. 2 shows a schematic representation of a further embodiment of a circuit system 10 comprising a second energy source 20 and a second switch unit 22. In a first state of the second switch unit 22, the second energy source 20 may be conductively connected to the battery management system 12 by the second switch unit 22. In a second state of the second switch unit 22, the energy supply of the battery management system 12 from the second energy source 20 may be interrupted, or disconnected. The controller 18 may also control the second switch unit 22.

For the configuration of the second switch unit 22 (second electric switch unit), the first and second states of the second switch unit 22 as well as the controller 18 of the second switch unit 22, the same applies as was mentioned above with reference to FIGS. 1a and 1b with regard to the configuration of the first switch unit 14 and the first and second states of the first switch unit 14 as well as the controller 18 of the first switch unit 14.

Moreover, a battery system 24 is shown as the first energy source 16 in FIG. 2. The battery system 24 will be explained with reference to FIG. 4 later on.

Just like the first switch unit 14, the second switch unit 22 may be controlled via the controller 18. In this manner, the first and second energy sources 16, 20 and, thus, the entire energy supply system of the battery management system 12 may be disconnected. This enables energy consumption of zero for the battery management system 12. The controller may be configured such that also the first switch unit 14 will open when the second switch unit 22 is opened.

The second energy source 20 may be configured as an energy supply network or as an on-board power supply. Any arrangement acting as an electric energy source may be used as the second or external energy source 20. With a fixedly installed circuit system 10 such as part of a solar power plant or a wind power plant, for example, the second energy source 20 may be a local power supply network of an energy provider, for example. The power supply network may also include an additional power supply unit. Thus, it is possible to supply the battery management system 12 with energy on the part of the second energy source 20 over a relatively long time period. In a circuit system 10 installed on board a vehicle, for example, a second independent on-board power supply of the vehicle, which has further control electronics connected to it, for example, may be used as the second energy source 20. In addition, it is also possible to use a battery, or an accumulator, which supplies the battery management system 12 with energy, as the second energy source 20. By supplying the battery management system 12 with energy by means of a second energy source 20, the battery management system 12 may be supplied with energy independently of a state of charge of the first energy source 16.

The controller 18 may be configured to be supplied with electric energy from the first energy source 16 or a further energy source. The controller 18 may be optimized to exhibit low energy consumption, and advantageously exhibits a level of energy consumption that is lower than that of the battery management system 12. By supplying energy from the first energy source 16, energy self-sufficient operation of the circuit system 10 can be achieved. Due to a low energy consumption of the controller 18, the discharge of the first energy source 16 may be reduced, and, thus, the runtime of the circuit system 10 may be increased. By supplying the controller 18 with energy from a further energy source, the controller 18 may also be operated, however, independently of the state of charge of the first energy source 16.

FIG. 2 shows a means 26 electrically connected to the battery system 24. The means 26 may be a consumer (load) and/or a producer of electric energy. Loads may be, e.g., the motor of an electric vehicle or an electric household appliance and/or the local power supply network of an energy provider (e.g. connected via a DC-AC inverter). Producers may be solar or wind power plants or also a power supply network (e.g. connected via a charging circuit). The charging circuit may be integrated into or may be external to the battery management system 10. It is also possible for a plurality of means 26 to be connected to the first energy source 16 in parallel or in series. The battery management system may control the means 26 being switched on or off (not shown in FIG. 2).

Figure 3:
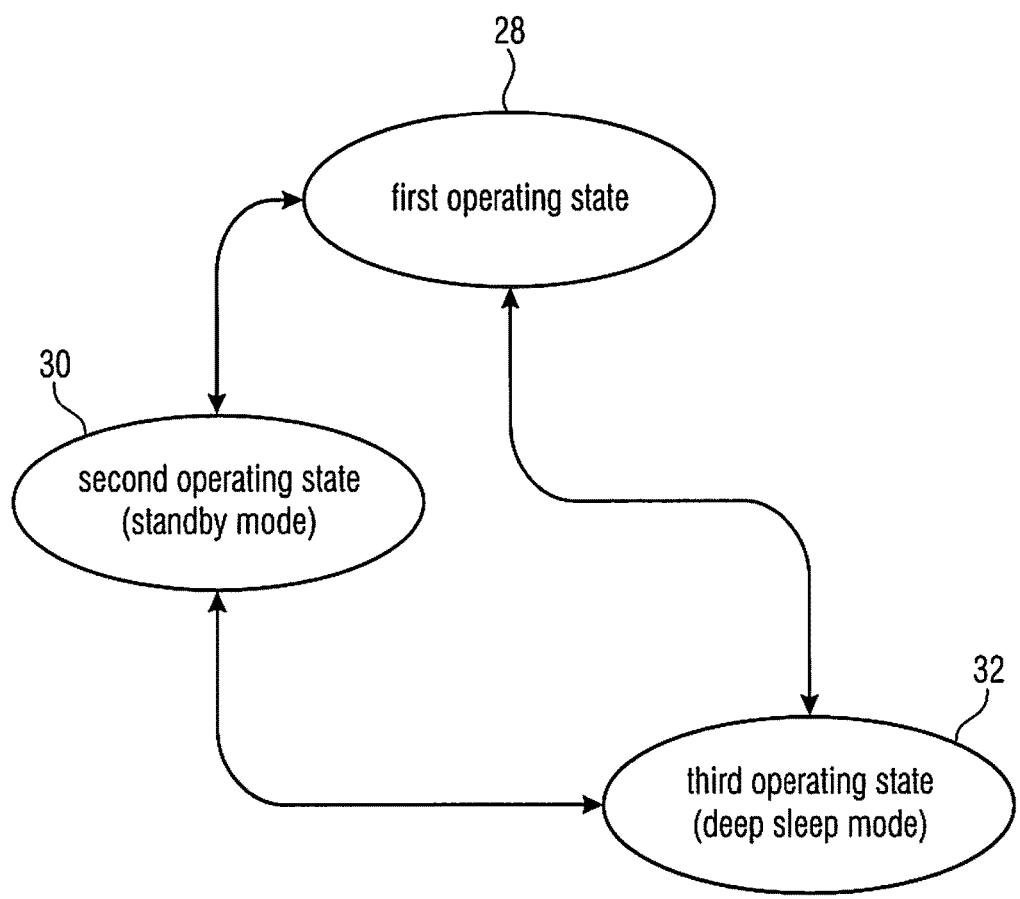
FIG. 3 shows a state machine of a battery management system.

FIG. 3 shows a state machine of a battery management system 12. The battery management system 12 may be configured to adopt different operating states.

The battery management system 12 may adopt a first operating state 28 when the first switch unit 14 and the second switch unit 22 are in the first state. In this state, the first energy source 16 and the second energy source 20 are conductively connected to the battery management system 12. In this manner, the battery management system 12 is supplied with energy by both energy sources 16, 20. This first operating state 28 often represents the normal operating state of the battery management system 12, in which the battery management system may be fully activated.

The battery management system 12 may adopt a second operating state 30 when the first switch unit 14 is in the second state and the second switch unit 22 is in the first state. In this state, the battery management system 12 draws no energy from the first energy source 16. The battery management system 12 is supplied with energy by the second energy source 20 only. In the second operating state 30, the battery management system 12 is operated in a standby mode. In the second operating state 30, certain control or monitoring functions of the battery management system 12 may be reduced or switched off. Due to the reduced operation, the energy consumption of the battery management system 12 may be reduced, for example. For example, if the battery system 24 has no energy supplied to it over a relatively long time period, exhaustive discharge of the battery system 24 by the battery management system 12, which monitors the battery system 24, may be avoided or at least delayed. Exhaustive discharge of the battery system 24 may be prevented in that the energy supply of the battery management system 12 is reduced as much as possible.

The following table shows an overview of the possible switching states of the energy supply system:

| first switch unit 14 | second switch unit 22 | description of the switching state |
|---|---|---|
| second state | second state | the battery management system 12 consumes no energy, there is no monitoring, both switches are open |
| second state | first state | the monitoring unit 38 (controlling unit) of the battery management system 12 is supplied with energy, there is no direct consumption from the first energy source 16 |

-continued

| first switch unit 14 | second switch unit 22 | description of the switching state |
|---|---|---|
| | | (battery source) |
| first state | second state | this state is not provided for, the following applies: when the second switch unit 22 is open, the first switch unit 14 will also be open |
| first state | first state | both switches are closed, the battery management system 12 is supplied from the first energy source 16 (battery source) and the second energy source 20 (external source), full energy supply |

The controller 18 may control a first switch unit 14, the first switch unit 14 connecting, in a first state, the first energy source 16 to the battery management system 12. In a second state of the first switch unit 14, the energy supply of the battery management system 12 from the first energy source 16 is interrupted. Moreover, battery information may be output by battery-cell electronics 36 (see subsequent description with regard to FIG. 4). On the basis of the battery information, a test may be performed in terms of whether or not the condition for changing from a first operating state 28 to a second operating state 30 is met. In the first operating state 28, the first switch unit 14 may be in the first state, and in the second operating state 30, the first switch unit 14 may be in the second state. The controller 18 is instructed to change from the first operating state 28 to the second operating state 30 when specific preconditions are met.

On account of this wiring it is possible to set the battery management system 12 from the first operating state 28 in a second operating state 30 (standby state), in which no direct consumption of energy from the battery system itself takes place. A change from the first operating state 28 to the second operating state 30 may be performed, for example, when a certain threshold-value voltage of the battery system 24 is reached or is undercut.

Additionally, the battery management system 12 may adopt a third operating state 32 (deep sleep mode) when the first switch unit 14 and the second switch unit 22 are in the second state, i.e. completely disconnected. A change of state is effected by switching the energy sources 16, 20 (supply sources) of the battery management system 12 accordingly. In this state, the battery management system 12 draws no energy from the first energy source 16 or the second energy source 20. It is possible in this third operating state 32 to continue to perform certain functions of the battery management system 12 such as a wake-up function for the battery management system 12, for example, by means of a further energy source such as a capacitor, for example. The third operating state 32 may be configured such that the battery management system 12 has as low a level of energy consumption as possible.

The battery management system 12 may change from each of the three operating states 28, 30, 32 to a subsequent operating state 28, 30, 32. Thus, a change may be effected from the third operating state 32 of the battery management system 12 to the first operating state 28 of the battery management system 12 by switching on the first and second energy sources 16, 20.

The change from an operating state 28, 30, 32 to a subsequent operating state 28, 30, 32 may depend on certain preconditions. These may include a time duration or a point in time, for example. E.g., the battery management system 12 may change from the first operating state 28 to the second operating state 30 one hour after no more energy has flown to or out of the first energy source 16. It is also possible for the battery management system 12 to return from the second operating state 30 to the first operating state 28 for a relatively short time period, following a specific time period or at a certain point in time, so as to perform, e.g., state monitoring of the individual battery cells. Likewise, it is feasible for the battery management system 12 to change from the first operating state 28 to the third operating state 30 after a certain time period or at a certain point in time. Further preconditions for a change of the operating state 28, 30, 32 may be a state of charge or a voltage. For example, if the first voltage source 16 falls below a predefined voltage, the battery management system 12 may change from the first operating state 28 to the second or third operating states 30, 32.

Figure 4:
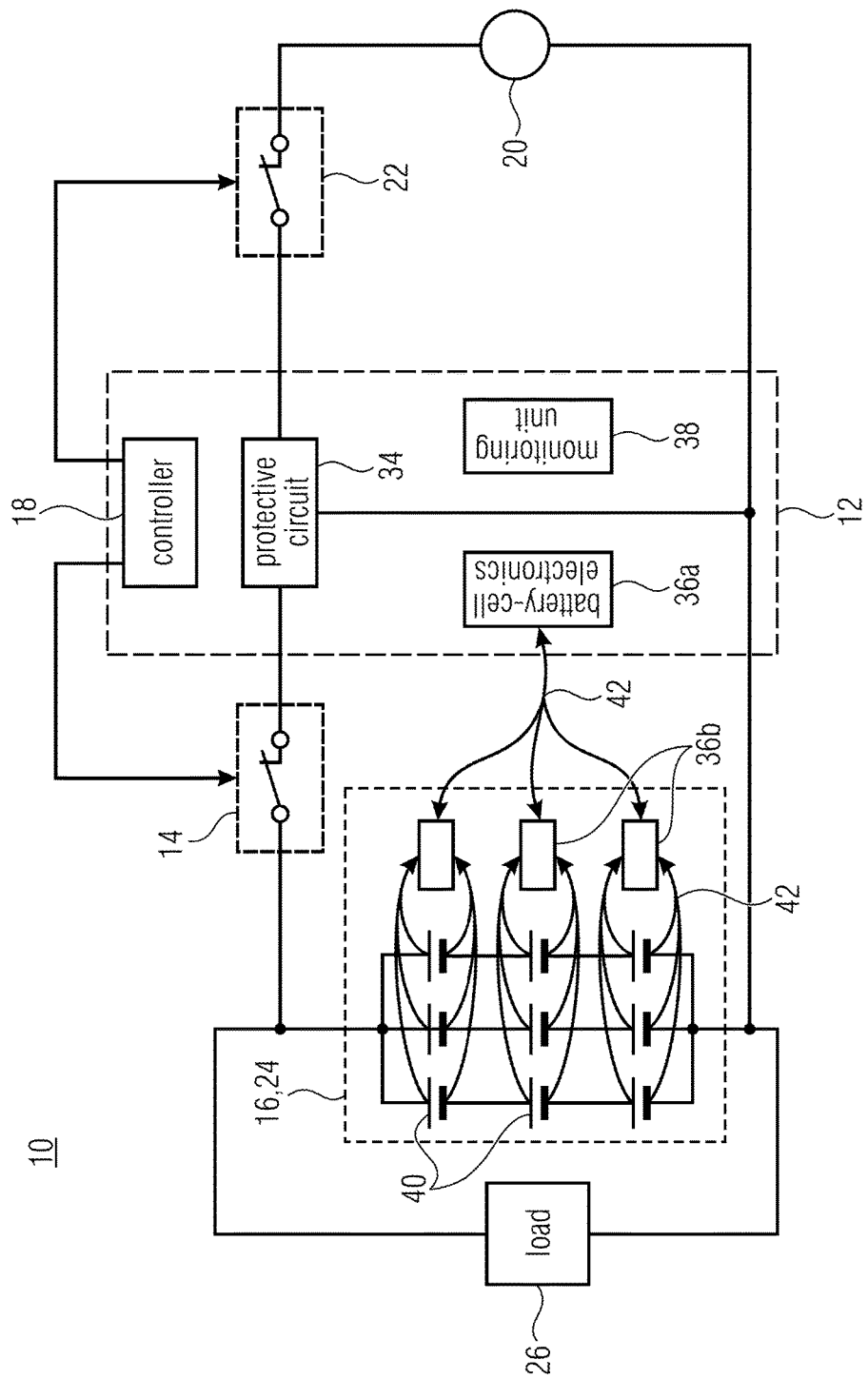
FIG. 4 shows a schematic representation of a further embodiment of a circuit system.

FIG. 4 shows a schematic representation of a further embodiment of a circuit system 10. In the embodiment, the controller 18 is configured as part of the battery management system 12. Thus, the controller 18 represents a controlling unit which is located directly on the battery management system 12 and is capable of controlling possible types of switches (switch units 14, 22). The first and second switch units 14, 22 might also be configured as parts of the battery management system 12 (not shown in FIG. 4). By integrating the controller 18 and by possibly integrating the first and second switch units 14, 22, additional installations such as cables and housings, for example, on the circuit system 10 may be avoided, and the installation expenditure as well as costs may be reduced.

The circuit system 10 may comprise a protective circuit 34 configured to limit a current intensity that is present between the first energy source 16 and the second energy source 20 to an admissible maximum value or essentially to zero. For supplying the battery management system 12 or parts thereof with current from different energy sources, a protective circuit 34 may be provided which prevents uncontrolled charge transfer from occurring between the energy sources 16, 20 in the first operating state 28 of the battery management system 12. The protective circuit 34 may be composed of diodes, for example, which allow a current to flow in one direction and prevent it from flowing in the opposite direction. As a result, the protective circuit 34 may prevent, for example, the first energy source 16 from being supplied with energy by the second energy source 20, and/or may prevent the first energy source 16 from delivering energy to the second energy source 20.

The battery management system 12 may include at least one unit of battery-cell electronics 36a, 36b and one monitoring unit 38. The battery-cell electronics 36a, 36b may determine battery information 42 such as the current, voltage or temperature of a battery cell or of a battery system, for example. The battery-cell electronics 36a, 36b may further perform cell balancing in battery cells, i.e. the state of charge between the battery cells is balanced. The battery-cell electronics 36a, 36b is also referred to as the front end.

FIG. 4 shows various embodiments of battery-cell electronics 36a, 36b. The battery-cell electronics 36b may be arranged, for example, at a location remote from the battery management system 12 or directly in the battery management system as the battery-cell electronics 36a. "At a location remote from the battery management system 12" may be understood to mean, for example, close to or at a battery cell 40 or a group of, e.g., 12 battery cells 40. The battery-cell electronics 36a, 36b may be supplied with energy directly from the battery cells 40. The battery-cell electronics 36a, 36b may determine battery information 42. Depending on the architecture of the battery system 24, it is also possible for several units of battery-cell electronics 36a, 36b to detect battery information 42 and/or to mutually exchange battery information 42 via a communication system.

The monitoring unit 38 may consist of a microcontroller or the like, on which corresponding host functions such as the determination of the state of the battery system 24 (state of charge, SOC; state of health, SOH), error management, thermal management for regulating a cooling system as well as various communication interfaces and load management may be implemented. To this end, the monitoring unit 38 may access temperature measurement channels and corresponding communication modules for an exchange of data with, e.g., the battery-cell electronics 36a, 36b, the controller 18 or other modules such as external monitoring systems. The monitoring unit 38 is also referred to as a control unit.

The battery management system 12 may be configured such that the battery-cell electronics 36 and the monitoring unit 38 are supplied with energy from two different energy sources. The battery-cell electronics 36 may be supplied with energy from the first energy source 16. The monitoring unit 38 may be supplied with energy from the second energy source 20. By supplying the battery management system 12 with energy from different energy sources, the energy supply of parts of the battery management system 12 may be rendered independent of the energy reserve existing within the first energy source 16. For example, given a low energy reserve within the first energy source 16, the battery management system 12 or parts thereof can be supplied with energy from the second energy source 20. For example, this enables controlling the first switch unit 14 on the part of the battery management system 12. The monitoring unit 38 (controlling unit) of the battery management system 12 keeps being supplied with energy without consuming energy directly from the first energy source 16. Further discharging of the first energy source 16 is avoided. However, it is also possible, e.g. at certain points in time, to enable the battery-cell electronics 36 to be briefly switched on and/or to enable temporary wakeup (first operating state 28).

The battery system 24 may be composed of one or more battery cells 40. The battery cells 40 may be electrically connected in series. As a result, a higher voltage for the battery system 24 is achieved. In addition, the battery cells 40 may be connected in parallel with one another. This results in a higher capacitance for the battery system 24. It is also possible to combine battery cells connected in series and battery cells connected in parallel.

The battery management system 12 may be configured to generate, on account of the battery information 42 output by the battery-cell electronics 36a, 36b and of monitoring information output by the monitoring unit 38, control information and to transfer said control information to the controller 18. Subsequently, the control information may be output to the first switch unit 14 or to the second switch unit 22, for example by means of a data bus. The switch units 14, 22 may change their states on account of the control information. For example, a normally closed contact shown as a switch unit 14, 22 in FIG. 4 may change from a first conducting state to a second non-conducting state.

The battery management system 12 may be configured to ascertain that no energy is flowing to the first energy source 16 and that no energy is flowing out of the first energy source 16, and may consequently cause the battery management system 12 to change from the first operating state 28 (e.g., normal operation) to the second operating state 30 (e.g., standby operation). The circuit system 10 may be used for operating the battery system 24. Charging and discharging operations, during which energy flows to and out of the battery system 24, may take place in alternation. While energy flows to and out of the battery system 24, the battery management system 12 may be in the first operating state 28 in order to be able to react to changing parameters such as the energy flow direction or the magnitude of the energy flow, the temperature of the battery system 24 or the state of charge of the battery system 24. When no energy flows to or out of the battery system 24, the battery management system 12 may change from a first operating state 28 to a second operating state 30 so as to not withdraw any energy from the first energy source 16.

The disclosed embodiments may relate to a battery management system 12 which can be fully disconnected, by means of internal and external control, from the object to be monitored, namely the battery cell 40 or the battery system 24 (battery unit). Thus, an energy consumption of zero and stepwise reduction of the energy consumption within the battery system 24 are possible. The system may comprise two switch units 14, 22 (switches), which are internally controlled by the battery management system 12 (BMS) and externally controlled by a different electric controlling unit (controller 18). Consequently, there is the possibility of switching the energy consumption of the battery management system 12 (BMS) to come directly from the battery system 24 (battery source) and/or to switch the consumption of energy from a second energy source 20 (external source).

Figure 5:
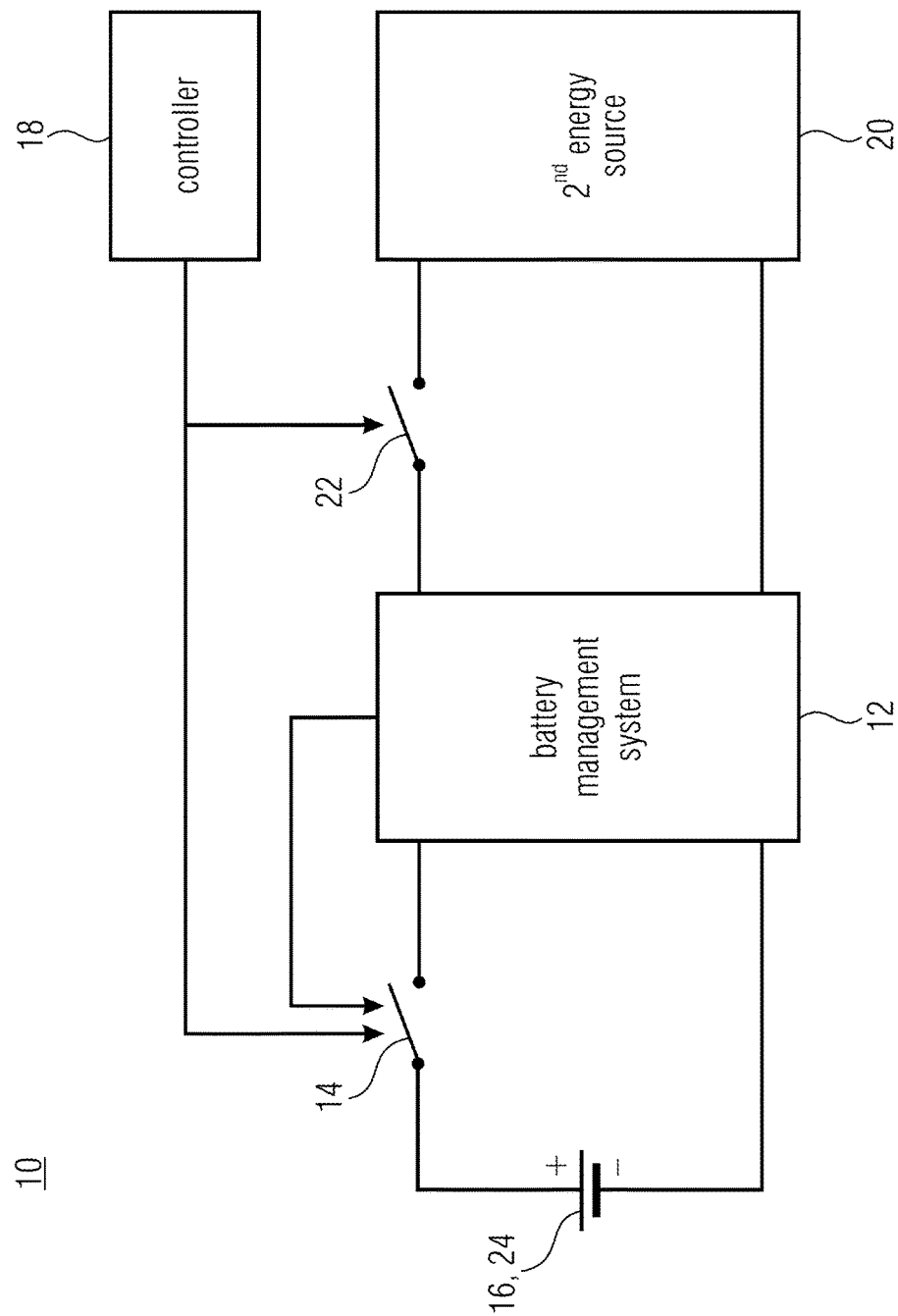
FIG. 5 shows a schematic representation of a further embodiment of a circuit system.

FIG. 5 shows a schematic representation of a further embodiment of a circuit system 10. The circuit system 10 includes the battery management system 12 and the first switch unit 14, which in the first state conductively connects the battery system 24 to the battery management system 12 and in the second state disconnects the energy supply of the battery management system 12 from the battery system 24 (or, generally, from the first energy source 16). In the first state, the second switch unit 22 conductively connects a second energy source 20 to the battery management system 12 and in the second state disconnects the energy supply of the battery management system 12 from the second energy source 20.

In addition, the circuit system 10 includes the controller 18 which controls the first and second switch units 14, 22.

Alternatively, the controller 18 may be integrated into the battery management system 12 and may control the first switch unit 14 only, for example (as is indicated by the arrow from 12 to 14). The circuit system 10 may have a ground reference.

An embodiment of a battery management system 12 will be described below. By way of example, a battery management system 12 is mentioned which is responsible for monitoring 12 battery cells 40 connected in series. The BMS 12 has battery-cell electronics 36 (front-end wiring) directly located at a cluster of battery cells. Said battery-cell electronics 36 performs voltage measurement and cell balancing of the battery cells 40 and is supplied with energy directly from the battery (first energy source 16) itself. In addition, the BMS 12 comprises a monitoring unit 38 (controller part) consisting of a microcontroller, several temperature measurement channels and corresponding communication modules for exchanging data with external monitoring systems. The monitoring unit 38 (controller part) is supplied by an external energy source (second energy source 20). Let us assume the external energy source is a conventional 230 VAC supply. Let us assume the application is a Solar Home System connected to the electrical network, the battery system 24 serves as a temporary storage for the solar energy and accordingly provides stored energy as needed. An overall battery system may contain several such above-described battery systems 24 (batteries) along with a superordinated monitoring unit 38. In the second operating state 30 (standby mode), the battery system 24 (battery) is disconnected from the BMS 12 itself via a first switch unit 14 (switch) and, consequently, the battery-cell electronics 36 (front-end wiring) is put out of operation. The BMS 12 can be set into the first operating state 28 again at any time, but will not provide any measurement data of the battery-cell electronics 36 while being in the second operating state 30 since said battery-cell electronics 36 is switched off and exhibits no more current consumption. The BMS may be additionally disconnected from the 230 VAC supply (second energy source 22) by the controller 18 and the second switch unit 22, controlled by the superordinated monitoring unit 38. The BMS will then be in the third operating state 32 (deep sleep mode) and will consume virtually no more energy.

Embodiments exhibit various advantages. The effect consists in the intelligent switching-off by the BMS 12 system itself and/or the controller 18 (superordinated external unit).

1. Increased self-discharge of the battery system 24 (first energy source 16: battery cell 40 or battery unit) and/or increased consumption of energy from a first energy source 16 is curbed, and the energy efficiency of such circuit systems 10 is increased. This is of major importance in particular in battery supply systems.

2. Embodiments exhibit improved maintainability of circuit systems 10. Relatively long downtimes may be tolerated without regularly testing the battery system 24 (battery source). Mechanical separation of the BMS 12 electronic unit from the battery system 24 (battery) in the event of a predictable relatively long downtime is no longer necessary. In the event of an unforeseen relatively long downtime, the risk of exhaustive discharge is substantially reduced.

3. The reliability of such circuit systems 10 is increased in that exhaustive discharge caused by self-discharge on the part of the BMS 12 is prevented in advance in that the BMS 12 may intelligently change, in the second operating state 30 (standby mode), to the third operating state 32 (full switching-off) if it detects a low state of battery charge.

4. Reduced energy consumption and increased efficiency typically entail economic advantages and are easy on the environment.

Embodiments may cover all sorts of BMS 12 variants: BMS including cell balancing, temperature measurement, voltage measurement, state determination (SOC, SOH), error management, communication. In addition, possible external controlling units (e.g., first and/or second switch unit 14, 22, controller 18, protective circuit 34, battery-cell electronics 36, monitoring unit 40) may be configured to be integrated on the BMS 12 itself or to be remote from one another (all on one circuit board or all separated). A battery management system 12 may contain further functions or modules such as a controller for a cooling system, a safety system or an Ethernet user interface, for example. Functions may also be detected by the battery management system 12 or may be externally detected by additional modules. A galvanic separation may exist between different modules within the battery management system 12. Advantageously, there is a galvanic separation between the battery-cell electronics 36 and the monitoring unit 38.

In embodiments, the integrated electronics of the battery management system 12 may be disconnected from direct battery supply (first energy source 16). Direct energy consumption of the electronic unit (of the battery management system 12) integrated within a battery system 24 is almost zero or equal to zero in specific states (in the third operating state 32).

Fields of application of battery systems 24 may be the following: storage systems in the context of photovoltaics, biogas plants, wind power plants, water power plants for self-sufficient current supply systems or for network-integrated systems (application in detached houses and apartment buildings or in villages and cities) as well as traction batteries of electric vehicles. In addition, any other fields of application for storage systems which include chemical storage devices. The type of battery can be freely chosen. In addition to lithium ion battery cells, other types such as nickel-cadmium batteries, lead accumulators, high-temperature batteries or redox-flow batteries, for example, may be used. In addition to battery systems 24, the embodiments may also be employed in other supply systems so as to save energy and to render electric supply systems more economic.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or actually cooperate, with a programmable computer system such that the respective method is performed. This is why the digital storage medium may be computer-readable.

Some embodiments in accordance with the invention thus include a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A circuit system comprising:
a battery management system,
a first switch unit which in a first state conductively connects a first energy source to the battery management system and in a second state opens so as to disconnect the energy supply of the battery management system from the first energy source,
a second switch unit, which in a first state conductively connects a second energy source to the battery management system and in a second state opens so as to disconnect the energy supply of the battery management system from the second energy source, and
a controller which controls the first switch unit and the second switch unit,
the battery management system comprising at least one unit of battery-cell electronics configured to be supplied with energy by the first energy source, and a monitoring unit configured to be supplied with energy by the second energy source, and
the controller being configured to control the first switch unit and the second switch unit such that the following applies: when the second switch unit is in the second state, the first switch unit will also be in the second state.

2. The circuit system as claimed in claim 1, wherein the first energy source is a battery system controlled by the battery management system.

3. The circuit system as claimed in claim 1, wherein the second energy source is configured as an energy supply network or an on-board power supply.

4. The circuit system as claimed in claim 1, the circuit system comprising a protective circuit configured to limit a current intensity that is present between the first energy source and the second energy source to an admissible maximum value or essentially to zero.

5. The circuit system as claimed in claim 1, wherein the controller is configured to be supplied with electric energy from the first energy source or a further energy source.

6. The circuit system as claimed in claim 1, wherein the controller is configured as part of the battery management system.

7. The circuit system as claimed in claim 1, wherein the battery-cell electronics is arranged at a location remote from the battery management system.

8. The circuit system as claimed in claim 1, wherein the battery management system is configured to adopt various operating states, the battery management system
adopting a first operating state when the first switch unit and the second switch unit are in the first state,
adopting a second operating state when the first switch unit is in the second state and the second switch unit is in the first state,
adopting a third operating state when the first switch unit and the second switch unit are in the second state.

9. The circuit system as claimed in claim 1, wherein the battery management system is configured to generate, on account of battery information output by the battery-cell electronics and of monitoring information output by the monitoring unit, control information and to transfer said control information to the controller.

10. The circuit system as claimed in claim 9, wherein the battery management system is configured to ascertain that
no energy is flowing to the first energy source; and
no energy is flowing out of the first energy source
and to consequently cause a change from a first operating state of the battery management system to a second operating state of the battery management system.

11. A non-transitory digital storage medium having a computer program stored thereon to perform the method of wiring an energy supply system of a battery management system, said method comprising:
controlling a first switch unit and a second switch unit on the part of a controller, said controlling comprising:
connecting a first energy source to at least one unit of battery-cell electronics of the battery management system on the part of the first switch unit in a first state;

disconnecting the energy supply of the battery-cell electronics of the battery management system from the first energy source in a second state of the first switch unit in that the first switch unit opens, connecting a second energy source to a monitoring unit of the battery management system on the part of the second switch unit in a first state; and disconnecting the energy supply of the monitoring unit of the battery management system from the second energy source in a second state of the second switch unit in that the second switch unit opens, the first switch unit and the second switch unit being controlled such that the following applies: when the second switch unit is in the second state, the first switch unit will also be in the second state, when said computer program is run by a computer.

* * * * *